Patented Sept. 9, 1941

2,255,396

UNITED STATES PATENT OFFICE 2,255,396

CHEMICAL PROCESS

William J. Sparks, Alexandria, Va., and Clifford W. Muessig, Union, N. J., assignors to Standard Oil Development Company, a corporation of Delaware No Drawing. Application December 21, 1939, Serial No. 310,404

15 Claims. (Cl. 252—59)

This invention relates to mixed polymers or interpolymers, and relates particularly to high molecular weight polymers containing both an olefin such as isobutylene and an aryl substituted acetylene such as phenyl acetylene.

A low temperature technique for the polymerization of isoolefins such as isobutylene by the application of boron trifluoride has been developed which produces polymers having molecular weights ranging from about 1,000 up to 250,000 or more, varying in large degree according to the lowness of the temperature and the purity of the isobutylene. The resulting polymers of pure isobutylene have a great many valuable characteristics, but their properties are not satisfactory for all possible uses. Attempts have been made to modify the characteristics of such polymers by a process of mixed polymerization of isobutylene and another polymerizable substance. In most instances, the differences in polymerization characteristics of the mixed substances are so great that only unmixed polymers of the more easily polymerizable constituent of the mixture are produced, and this has particularly been found to be the case with mixtures of isobutylene and acetylene, which to the present have been found to be impossible of mixed polymerization, in spite of the relative ease of polymerization of the respective pure substances.

The present invention produces a mixed polymer of an isoolefin such as isobutylene and an aryl acetylene derivative of the type of phenyl acetylene. It is found that mixed polymers of this type from, for instance, isobutylene and phenyl acetylene can be produced by the polymerization of mixtures of isobutylene and phenyl acetylene at low temperatures by the application thereto of a Friedel-Crafts type catalyst, especially a catalyst in the form of aluminum chloride dissolved in an alkyl halide. By adjustment of the proportions of isobutylene and phenyl acetylene, the proportion of the substances in the mixed molecule can be controlled, and in addition the ultimate molecular weight of the polymer can be controlled both by the lowness of the temperature, and to some extent by the catalyst concentration.

Thus, an object of the invention is to interpolymerize on olefin or isoolefin such as isobutylene and an aryl acetylene such as phenyl acetylene. Other objects and details of the invention will be apparent from the following description.

In practicing the invention, the olefin such as isobutylene (boiling point —6° C.) and the aryl substituted acetylene such as phenyl acetylene (boiling point 142° C.) are mixed at a temperature below about —50° C., the temperature being preferably below —73° C. The mixed liquid substances are then treated with a catalyst consisting of aluminum chloride dissolved in methyl or ethyl chloride which has been previously chilled to the same temperature. The catalyst solution is desirably added as a fine spray onto the surface of the rapidly stirred mixture. The polymerization occurs rapidly to produce the desired polymer.

Example 1

A mixture of 50 parts of phenyl acetylene and 50 parts of isobutylene by weight were cooled to —78° C. by the admixture therewith of an excess of solid carbon dioxide. When the desired low temperature of —78° C. was reached, the catalyst consisting of a solution of aluminum chloride in ethyl chloride in the proportion of approximately 0.7% by weight was added to the chilled liquid mixture as a fine spray while stirring rapidly. The polymerization reaction occurred rapidly to yield a polymer which is a white solid, insoluble in the polymerization mixture. The polymer was removed from the reaction chamber after first quenching the catalyst by the addition of isopropyl alcohol. It was then washed with hot water followed by a weak alkaline wash to remove the last traces of the catalyst and its hydrolytic products.

Various modifications are readily possible in the above example. The solid carbon dioxide which serves as the cooling agent may be replaced by a diluent-refrigerant such as liquid propane or liquid ethylene, or a separate diluent may be used such as ethyl or methyl chloride or propane or other similar substances together with solid carbon dioxide either in powdered or lump form for the cooling material.

The catalyst in the above example is added in the form of a spray and is the preferred procedure. Alternatively, however, the catalyst may be poured in slowly in a small stream, especially if a diluent or diluent-refrigerant is used, and the stirring is quite vigorous.

The addition of catalyst is preferably continued until no further indications of polymerization are evident.

It is preferable, but not essential, that the catalyst be quenched or inactivated at the low polymerization temperature, and for this purpose the preferable procedure is to add a substantial quantity of isopropyl alcohol to the reaction mixture containing the solid polymer as above pointed out. Alternatively, various other quenching agents than isopropyl alcohol may be used. These include such substances as acetone, ethyl or methyl alcohol, and in fact substantially any of the organic oxygenated compounds, although liquid aliphatic alcohols and ketones are preferred, and it is also preferable that they be substances which are still liquid at or near the reaction temperature.

The polymer has been found to be soluble in such solvents as benzene and other hydrocarbons but insoluble in substantially all of the oxygenated solvents. Accordingly, the polymer may be dissolved in a solvent such as the light naphthas or benzene, and it is readily precipitated from such solutions by the addition to the solution of such substances as isopropyl alcohol. The polymer precipitates upon the addition of a relatively small amount of the alcohol, and complete precipitation may be obtained by the addition of a sufficient excess. The precipitated polymer is conveniently dried for several hours at 100° C. in a vacuum oven to remove traces of solvent. Analysis of the material produced as described in Example 1 showed the following results which are listed below along with the theoretical composition of polyisobutylene and polyphenyl acetylene.

|   | Sample | Polyisobutylene | Polyphenyl acetylene |
|---|---|---|---|
| C | 86.09 | 85.6 | 94.7 |
| H | 12.57 | 14.4 | 5.3 |

Based upon this analysis, the mixed polymer appeared to consist of about 87% of isobutylene molecules and 13% of phenyl acetylene molecules polymerized into the polymer molecules.

The molecular weight of the interpolymer produced as above described is approximately 50,000. It appears, however, that this molecular weight is quite constant and uniform at any given temperature, and fractional precipitation of the polymer from solution as above described does not result in fractions of different molecular weights, as is found to be the case with polyisobutylene.

The polymer as so produced is physically a white, plastic solid, somewhat stringy and capable of cold flow.

*Example 2*

Another mixture of phenyl acetylene and isobutylene was prepared containing 20% of phenyl acetylene and 80% of isobutylene by weight. This material was cooled as before and polymerized by the procedure indicated in Example 1 and the pure polymer was separated by a similar solution and precipitation procedure. Upon subsequent analysis it was found to contain 86.18% carbon and 13.53% hydrogen. Based upon this analysis, calculations show that the polymer contains approximately 8% of phenyl acetylene, and 92% of isobutylene.

The procedures indicated in Examples 1 and 2 utilize for the catalyst a solution of aluminum chloride in an alkyl halide such as ethyl or methyl chloride. Other dissolved catalysts are, however, equally usable. A solution of aluminum chloride in carbon disulfide is similarly useful, especially when the catalyst has been prepared by a substantial period of heating, to modify the color of the original solution. Likewise, solutions of titanium tetrachloride dissolved in ethyl or methyl chloride are similarly useful. Likewise, solutions of boron trifluoride in such solvents as the alkyl halides or in ethane or ethylene are similarly useful. The above-listed catalysts are representative samples of a substantial number of solutions of Friedel-Crafts substances which are useful as catalysts in the present invention.

*Example 3*

Both of the above polymers were found to be soluble in lubricating oils, and on subsequent addition to a lubricating oil were found to produce valuable thickening properties in the oil and to increase its viscosity and viscosity index. Substantially no difference was found in the thickening effects of the two polymers as produced by Example 1 and Example 2. A typical thickening effect is shown by the following table which shows the change in viscosity produced by the dissolving of 5% of the mixed polymer in a suitable lubricating oil:

|   | Sun 20W | Sun 20W+5% of copolymer |
|---|---|---|
| Vis./100 | 276 | 609 |
| Vis./210 | 46 | 68 |
| V. I. | 17 | 92 |

From these data it is apparent that this product greatly improves the viscosity index characteristics of lubricating oil.

The above examples utilize for the reaction, mixtures of isobutylene and phenyl acetylene. Substantially any of the alkyl substituted phenyl or naphthyl acetylenes are useful for this reaction and various of the isoolefins or simple olefins may be substituted in part or in whole for the isobutylene; particularly such substances as propylene and the amylenes are useful, as well as ethylene, which serves mainly as a diluent-refrigerant.

The invention thus consists in the interpolymerization of mixtures of an olefin such as isobutylene and an aryl acetylene such as phenyl acetylene to produce new and valuable polymers which are soluble in lubricating oil to produce a new and valuable increase in viscosity and viscosity index of a mineral lubricating oil.

While there are above disclosed but a limited number of embodiments of this invention, it is possible to produce still other embodiments without departing from the inventive concepts herein disclosed, and it is therefore desired that only such limitations be imposed on the appended claims as are stated therein or required by the prior art.

The invention claimed is:

1. The process of producing high molecular weight polymers comprising the steps of mixing isobutylene and phenyl acetylene, chilling the mixture to temperatures below −50° C. and polymerizing the mixture by the application thereto of a Friedel-Crafts type catalyst.

2. The process of producing high molecular weight polymers comprising the steps of mixing isobutylene and phenyl acetylene, chilling the mixture to temperatures below −50° C. and polymerizing the mixture by the application thereto of a Friedel-Crafts type catalyst comprising aluminum chloride.

3. The process of producing high molecular weight polymers comprising the steps of mixing isobutylene and phenyl acetylene, chilling the mixture to temperatures below −50° C. and polymerizing the mixture by the application thereto of a Friedel-Crafts type catalyst comprising a solution of aluminum chloride.

4. The process of producing high molecular weight polymers comprising the steps of mixing isobutylene and phenyl acetylene, chilling the mixture to temperatures below −50° C. and polymerizing the mixture by the application thereto of a Friedel-Crafts type catalyst comprising a solution of aluminum chloride in an alkyl halide.

5. The process of producing high molecular weight polymers comprising the steps of mixing isobutylene and phenyl acetylene, chilling the mixture to temperatures below −50° C. and polymerizing the mixture by the application thereto of a Friedel-Crafts type catalyst comprising a solution of aluminum chloride in methyl chloride.

6. The method of producing a mixed polymer comprising the steps of chilling isobutylene and an aryl substituted acetylene to a temperature below −50° C. and polymerizing the mixture by the application thereto of a Friedel-Crafts type catalyst.

7. The method of producing a mixed polymer comprising the steps of chilling isobutylene and an aryl substituted acetylene to a temperature below −50° C. and polymerizing the mixture by the application thereto of a Friedel-Crafts type catalyst comprising aluminum chloride dissolved in an alkyl halide.

8. A mixed polymer comprising in each molecule of polymer, molecules of isobutylene and molecules of an aryl substituted acetylene.

9. A mixed polymer comprising in each molecule of polymer, molecules of isobutylene and molecules of an aryl acetylene.

10. A mixed polymer comprising in each molecule of polymer, molecules of isobutylene and molecules of phenyl acetylene.

11. The process of preparing a lubricant comprising the steps of cooling isobutylene and phenyl acetylene to a temperature below −50° C., polymerizing the mixture by the application thereto of a Friedel-Crafts type catalyst and dissolving the polymer in a mineral lubricating oil.

12. The process of preparing a lubricant comprising the steps of cooling isobutylene and phenyl acetylene to a temperature below −50° C., polymerizing the mixture by the application thereto of a Friedel-Crafts type catalyst comprising aluminum chloride dissolved in an alkyl halide, and dissolving the polymer in a mineral lubricating oil.

13. A lubricant comprising a solution in mineral oil of a mixed polymer containing in the polymer molecules both isobutylene and phenyl acetylene molecules.

14. The process of producing high molecular weight interpolymers comprising the steps of mixing isobutylene and an aryl acetylene, cooling the mixture to a temperature below about −50° C., and polymerizing the mixture by the application thereto of a Friedel-Crafts type catalyst.

15. The process of producing high molecular weight interpolymers comprising the steps of mixing isobutylene and an alkaryl acetylene, cooling the mixture to a temperature below about −50° C., and polymerizing the mixture by the application thereto of a Friedel-Crafts type catalyst comprising aluminum chloride dissolved in methyl chloride.

WILLIAM J. SPARKS.
CLIFFORD W. MUESSIG.